Figure 7:
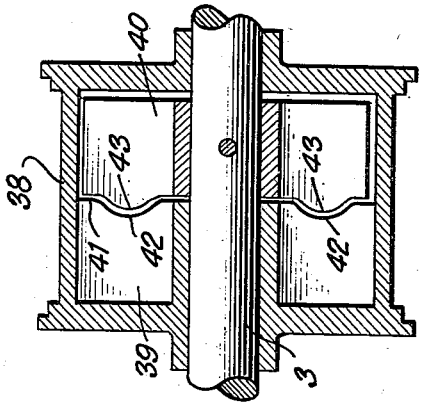

March 17, 1942.  H. GRIFFIN  2,277,019
FILM STABILIZER
Filed Dec. 31, 1938  3 Sheets-Sheet 1
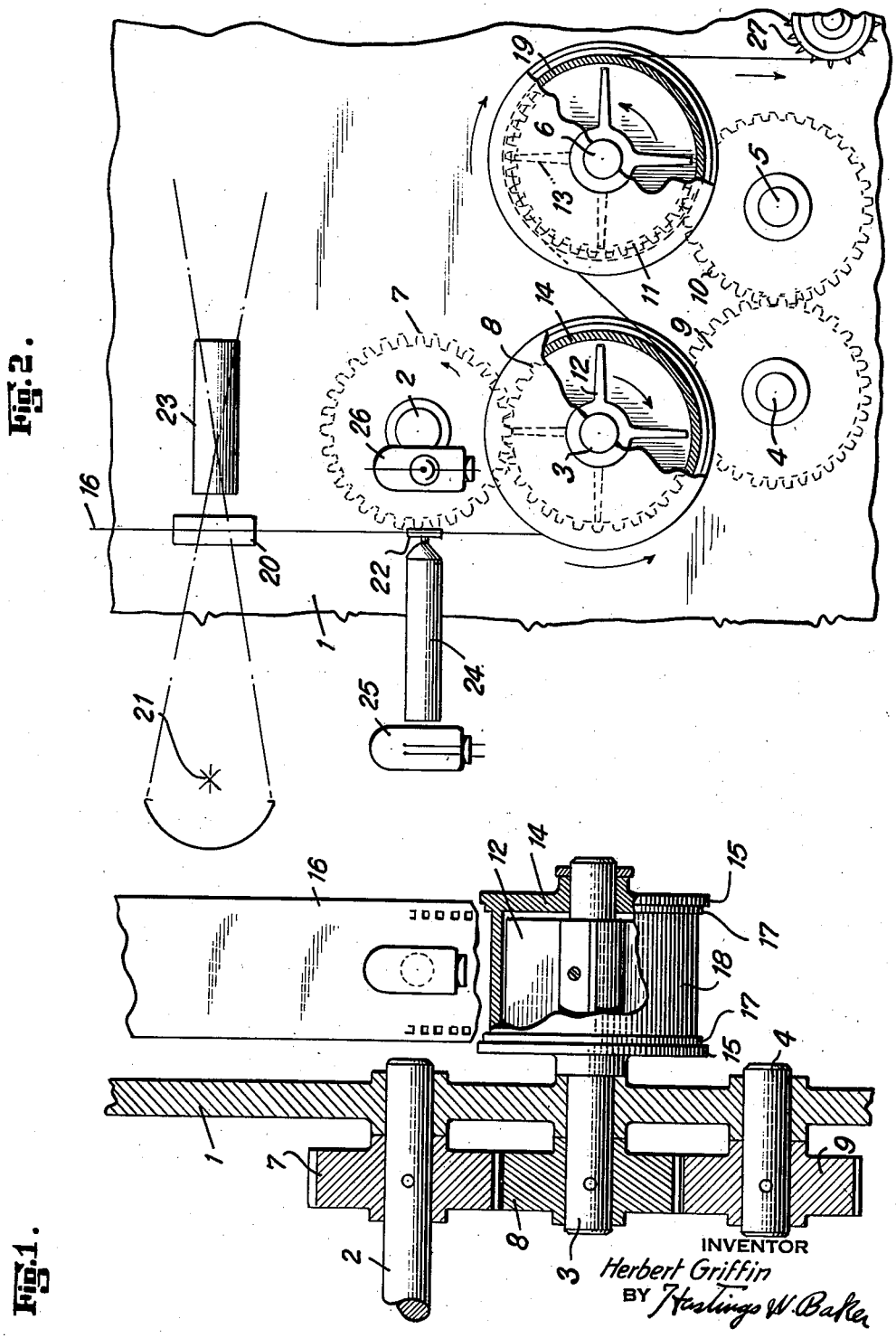
INVENTOR
Herbert Griffin
BY Hastings W. Baker
ATTORNEY March 17, 1942.    H. GRIFFIN    2,277,019
FILM STABILIZER
Filed Dec. 31, 1938    3 Sheets-Sheet 2
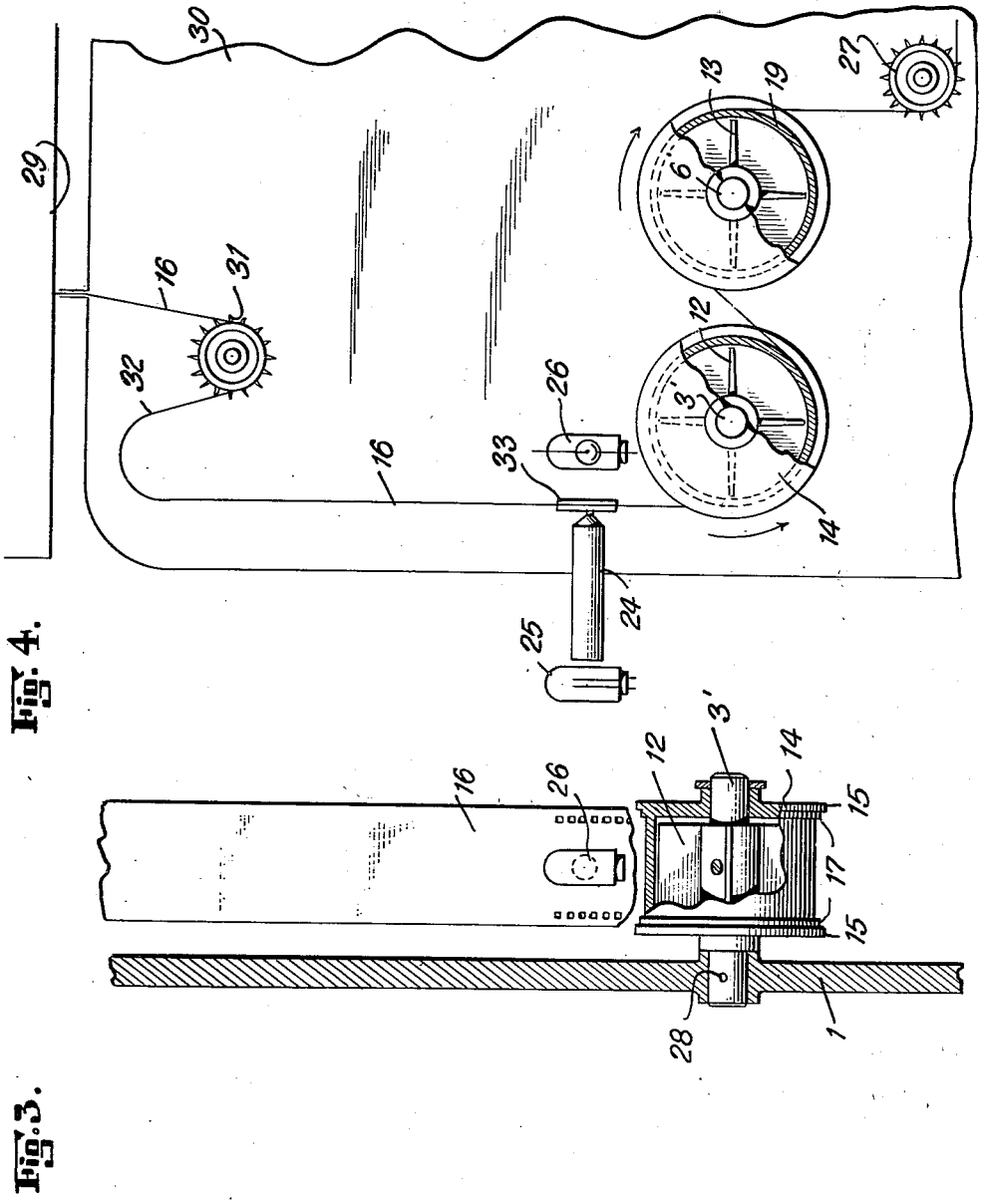
INVENTOR.
Herbert Griffin.
BY
Hastings W. Baker
ATTORNEY March 17, 1942.   H. GRIFFIN   2,277,019
FILM STABILIZER
Filed Dec. 31, 1938    3 Sheets-Sheet 3

INVENTOR
Herbert Griffin
BY Hastings W Baker
ATTORNEY

Patented Mar. 17, 1942

2,277,019

UNITED STATES PATENT OFFICE 2,277,019

FILM STABILIZER

Herbert Griffin, Jersey City, N. J.

Application December 31, 1938, Serial No. 248,673

17 Claims. (Cl. 271—2.3)

This invention relates to a means for stabilizing the motion of a film and is particularly adapted for use in connection with motion picture television as well as in connection with a sound reproducer mechanism of a motion picture projector.

In a motion picture projector in combination with a sound reproducer mechanism the motion picture film is fed forward intermittently through the projector, the film having successive frames showing the successive pictures. When the film is passed through the sound reproducer mechanism it is necessary for the film to travel uninterruptedly and any variation in the speed of the film through the sound translating mechanism or the sound head gives rise to many well-known disadvantageous effects. This difficulty was sought to be overcome by providing various forms of rotary stabilizers, the central idea in each case being to impart to the film as nearly a uniform motion as was possible to obtain. The object of this invention is to provide an improved film stabilizer.

In motion picture projector or television mechanism it is of the highest importance that the film should be given a uniformly steady feed so that its travel will be smooth and free from all material variations in speed. The ideal condition, of course, would be for the feed to be absolutely steady and it is the object of this invention to provide a feed for the film so that its motion will be more nearly uniform than has heretofore been attained.

It is impossible to feed the film forward uniformly when reliance is placed entirely on the use of sprockets and this is true because of the fact that there is always some slippage from tooth to tooth of the sprocket varying in amount and depending on the shrinkage of the film, sprocket imperfections and many other inherent defects.

Even if the sprocket pulling the film through the sound reproducer rotated at an absolutely uniform speed, the travel of the film through the beam of light passing through the sound track might not be uniform. The teeth of the said sprocket are of course spaced apart a uniform distance or as nearly so as modern manufacturing processes will permit. Film shrinks with age however and this shrinkage causes the sprocket holes of an old film to be spaced closer together than the holes of a film not so old. However, since the sprocket must accommodate all types of film, it follows that slippage takes place on all film in which the sprocket holes of the film are spaced further apart than the spacing between the teeth of the sprocket. The object of this invention is to give the film a more steady travel in spite of this slippage so that its progress through the beam of light in the sound reproducer mechanism will be as uniform as possible.

The present invention utilizes a sprocket which is rotated as nearly uniformly as possible and I interpose between this sprocket and the scanning aperture of the television equipment a novel form of stabilizer consisting of a hollow, freely rotatable drum under which the film is passed and in which drum is a vane mechanism which is preferably rotated in the opposite direction from the rotation of the drum and which hollow drum is filled with a viscous material. If desired, the vanes could be held stationary but in any case the vanes acting through the viscous material would act as a uniform brake on the film which would steady its travel through the television equipment and so that its travel would move the picture part of the film uniformly through the beam of light from the conventional light source and would move the sound track on the film uniformly through the sound optical system.

When my invention is used in connection with motion picture projectors in which there is an intermittent feed and in which the pictures are intermittently thrown on the screen, the ordinary projector would be used and, if desired, although it is not absolutely necessary, there may be a sprocket to form a loop before the film passed through a guide which might be a conventional film gate and trap and from which the film would travel uniformly through the sound reproducing mechanism around my improved film stabilizer and to the film propelling or take-up sprocket. It is, therefore, obvious that my invention would be useful both in connection with television equipment as well as in connection with the combined projector and sound reproducer mechanism for motion pictures. In stating these two uses I mention them only by way of illustration for the mechanism constituting this invention is useful in any place where it is desired to impart a uniform travel to flexible material such as, for example, a film.

The invention may be better understood by referring to the attached drawings in which—

Fig. 1 is a front elevational view partly in cross section of one of the drums under which the film passes and the means for actuating the vanes therein.

Figure 6:
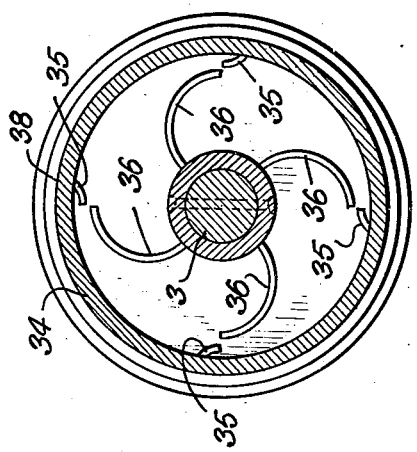
Figure 5:
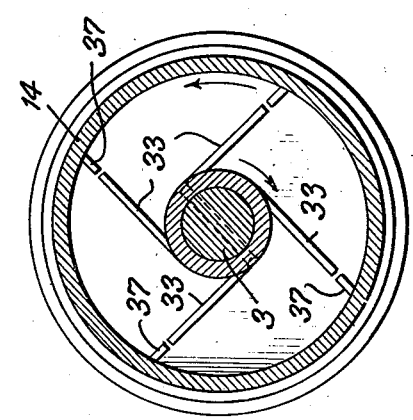

Fig. 2 is a side elevational view of a structure shown in Fig. 1 and showing in outline the film projection and sound reproducing mechanism for use in television, Fig. 3 is a modification of the mechanism shown in Fig. 1 and in this view the vanes are not rotated but are held stationary while the drum is free to rotate, Fig. 4 shows the mechanism used in connection with a motion picture projector and with the vanes stationary, Figs. 5 and 6 show side elevational views of two modifications of the arrangement of the vanes and, Fig. 7 is a cross sectional view of a third modification.

Regardless of whether my improved film stabilizer is used in connection with a motion picture projector or in a television scanning equipment, I prefer for the vanes to be rotated in the opposite direction from the travel of the drums under or over which the film passes. I, therefore, do not mean to suggest that the vanes be rotated for one use and not the other. I consider that the preferred form is for the vanes to rotate although the film stabilizer will be useful even if the vanes are held stationary.

Referring to Figs. 1 and 2, a support 1 is provided, which support carries rotatable shafts 2, 3, 4, 5, and 6. Secured to the shaft 2 is a pinion 7 which drives in succession the pinions 8, 9, 10, and 11. The pinion 8 is secured to the shaft 3. This shaft projects through the support 1 and on the other side of the support from the pinion 8 it has secured thereto vanes 12. In like manner the shaft 6 has secured thereto vanes 13. While I have shown the vanes as consisting of arms spaced 90° apart, I do not care to limit myself to the number of arms employed. In fact, one arm would be successful, but I consider that it is better to have a plurality of arms constituting the vanes. When the pinion 7 is rotated in a counter-clockwise direction as indicated by the arrow in Fig. 2 the vanes 12 will be rotated in a clockwise direction and the vanes 13 will be rotated in an anti-clockwise direction as viewed in Fig. 3. The vanes 12 are housed within a drum 14 rotatably mounted on the shaft 3. This drum is provided with outer flanges 15 which are spaced apart a distance equal to the width of the film 16. These flanges serve as a means to guide the film and prevent side motion thereof. The drum 14 is likewise provided with flanges 17 immediately inside of the flanges 15 and these flanges 17 serve as a support for the side marginal portions of the film so that the pictures on the film and the sound track thereon will be held above the portion 18 of the drum and on the flanges 17 to the end that the film and sound track will not be damaged by coming in direct contact with the drum.

A similar drum 19 is rotatably mounted on the shaft 6, which drum is identical in construction with the drum 14 and need not be further described.

For use in connection with television the film 16 is moved downwardly through the film gate and trap 20. A light source 21 of conventional design is provided from which the light is projected forwardly through the film as it continuously moves through the film gate and through the lens 23 in the conventional manner to scan the picture portion of the film. The film continues to move downwardly at a uniform speed past the sound optical system 24 which is placed between the exciter lamp 25 and the film and this well-known mechanism passes the light through the sound track while it is passing through the gate and trap 22 and to the photoelectric cell 26. The film continues to pass downwardly contacting the drum 14 and after passing around the lower portion thereof passes upwardly and around the drum 19 and to the sprocket 27.

It will be noted that the sprocket 27 is the means for pulling the film through the beam of light from the light source past the sound optical system and around my stabilizers, of which in the present instance I show two, although any desired number may be employed. It is further to be noted that while the film is causing the drum 14 to rotate in a counter-clockwise direction as viewed in Fig. 2 the vanes 12 are rotating in a clockwise direction. It is also to be noted that the drum 19 is rotated by the film in the opposite direction from the vanes 13. Both of the drums are filled with a viscous material which would in any case act as a brake on the film. This fluid or viscous brake stabilizes the motion of the film and causes its travel through the television equipment to be more nearly uniform than any stabilizer heretofore known to me.

In Fig. 3 I have omitted the pinions 7 to 11 inclusive and have made the shaft 3' non-rotatable by any conventional means such as a pin 28 or by other known means. The vanes 12 secured to the shaft would, therefore, be held stationary while the drum 14 would rotate with the film 16 as heretofore explained. The only difference, therefore, between the structure shown in Fig. 3 and that shown in Fig. 1 is that the vanes 12 and the shaft on which they are mounted are held stationary in Fig. 3 while they are positively rotated in Fig. 1. The shaft 6' would likewise be secured so that it would not rotate and the vanes 13 would, therefore, be held stationary. As above explained, this is an optional arrangement. If there is not a positive means to rotate the vanes in the opposite direction from the travel of the drums in which they are mounted, the vanes must then be held stationary for if they were freely rotatable with the drums, the vanes could not retard the viscous material in the drums and hence would fail to act as a retarding agent for the drums.

In Fig. 4 I have shown the improved stabilizer in connection with a motion picture projector and sound reproducer mechanism. The projector 29 is mounted above the sound reproducer mechanism 30. In the projector the film 16 is, of course, fed forwardly intermittently through a beam of light from the light source and is projected to the screen. It then is pulled downwardly into the sound reproducing mechanism by means of a sprocket 31. This sprocket 31 might just as well be in the projector or such a sprocket might be placed in both the projector and the sound reproducer mechanism. The sprocket 31 is rotated continuously and it forms a loop 32 in the film between the sprocket 31 and a tension device 33, which may be a conventional film gate, its function being to hold the film so that while it can be moved downwardly by the sprocket 27, the part of the film between the gate and trap 33 and the drum 14 would be held taut. The conventional exciter lamp 25, sound optical system 24 and photoelectric cell 26 as heretofore described is employed. The film stabilizers including the drums 14 and 19 function as heretofore described.

When a sprocket 27 is employed with a base diameter of 0.945 inch, the sprocket is provided with 16 teeth having a tooth pitch of 0.18672 inch. In film which has shrunk 0.15 per cent the film pitch (the distance between the forward edges of two succeeding sprocket holes) is 0.18672 inch so that in film which has shrunk 0.15 per cent and assuming that all of the film sprocket holes and all the sprocket teeth were absolutely uniformly spaced apart, there would be no slippage as the sprocket pulled the film forwardly. But film shrinks rapidly and even during the life of the print as a first run subject the shrinkage rapidly increases to 0.5 to 0.7 per cent. When the shrinkage amounts to 0.6 per cent the film pitch is 0.18588 inch so that in this case we have a film slippage of 0.00084 inch between each tooth and when the film has shrunk 1.5 per cent the film pitch is 0.1842 so that in this case we have a film slippage of 0.00252 inch between each tooth. When the film is thus slipping its feed would not be uniform unless some means were provided to tension it and iron out the irregularities caused by this slippage. My improved stabilizer provides a perfected means to iron out such irregularities as well as irregularities caused by any small lack of uniformity in the travel of the film as directly caused by the sprocket.

In Fig. 5 the drum 14 is rotated, as heretofore described, and in a counter-clockwise direction as viewed in said figure which would correspond to the direction of rotation of the drum 14 in Fig. 2. If desired, inwardly extending vanes 37 might be carried by the drum 14. The shaft 3 would rotate in the direction of the arrows as shown in Fig. 5, that is, in a clockwise direction. The vanes 33, however, instead of extending radially as shown in Fig. 2 are attached to the side of the shaft 3. If a radius were drawn from the center of the shaft 3 parallel to the vanes 33 it would be spaced from the vanes 33 by a distance equal to the radius of the shaft 3. It will, therefore, be noted that in Fig. 5 the vanes rotate so as to cause the fluid to impinge against the vanes and be moved towards the center of the drum causing a turbulence which would further retard the rotation of the drum 14. Of course, if desired, the shaft 3 could be held stationary as heretofore described. In case it is held stationary there would still be a turbulence caused by the direction in which the vanes 33 extend, but the turbulence would not be as great as when the shaft 3 were rotated.

In Fig. 6 I have shown a drum 34 similar to the drum 14 but provided with inwardly extending vanes 35. The shaft 3 is also provided with curved outwardly extending vanes 36, the vanes 35 and 36 being curved in opposite directions. This would accentuate the turbulence described in connection with Fig. 5.

In Fig. 7 I have provided a drum 38 similar to the drum 14 but provided with vanes 39 extending diametrically thereof and from one side toward the other side. On the shaft 3 I have provided a vane 40 extending radially therefrom which vane is enclosed in the hollow portion of the drum 38 and extends radially from the shaft 3. It will be noted that the vane 40 does not touch the drum 38 at any point. If desired, the inner edge 41 of the vane 39 might be partly straight and partly curved as indicated at 42. If the portion 42 is curved concavely, as shown in Fig. 7, the vane 40 might, at its edge nearest the vane 39, be curved convexly as indicated at 43. Obviously, the adjacent portions of the two vanes may be given any configuration, either straight edges or wavey lines, as desired. The longer the lines, however, or the more of a waving contour that they have, the greater would be the turbulence.

I realize that many changes may be made in the specific form of the invention shown by way of illustration in the attached drawings without departing from the spirit of my invention and I, therefore, desire to claim the same broadly except as I may limit myself in the annexed claims.

Having now described my invention, I claim:

1. A stabilizer consisting of a rotatable hollow drum, means to pull a flexible member while it is in contact with said drum so as to rotate said drum, a vane in the hollow portion of said drum, a viscous fluid in the hollow portion of the drum and in contact with the vane, and means to prevent the vane from rotating in the same direction as the drum.

2. In combination, a rotatable drum provided with an inner chamber, means to pull a flexible member while it is in contact with said drum so as to rotate said drum, a viscous fluid in said chamber, a vane in said chamber and immersed in said fluid, and means to prevent the vane from rotating in the same direction as the drum.

3. In combination, a rotatable drum provided with an inner chamber, means to pull a flexible member while it is in contact with said drum so as to rotate said drum, a viscous fluid in said chamber, a vane in said chamber and immersed in said fluid, and means to rotate the vane in the opposite direction from the rotation of the drum.

4. In combination, a power driven shaft, a drum mounted on said shaft and rotatable thereon, said drum being provided with an internal chamber, means to pull a film while it is in contact with said drum so as to rotate said drum, a vane secured to said shaft and housed in said chamber, a viscous fluid in said chamber in which the vane is immersed and means to rotate the drum in the opposite direction from the rotation of the shaft.

5. In combination, a rotatable drum provided with an inner chamber, means to pull a flexible member while it is in contact with said drum so as to rotate said drum, a viscous fluid in said chamber, a vane consisting of a plurality of arms in said chamber and immersed in said fluid, and means to prevent the vane from rotating in the same direction as the drum.

6. In combination, a rotatable drum provided with an inner chamber, means to pull a flexible member while it is in contact with said drum so as to rotate said drum, a viscous fluid in said chamber, a vane consisting of a plurality of spaced radially extending arms in said chamber and immersed in said fluid, and means to prevent the vane from rotating in the same direction as the drum.

7. In combination, two shafts, means to rotate the shafts in opposite directions, a vane secured to each shaft, a drum rotatable on each of said shafts, means to pull a film while it is in contact with said drums so as to rotate each of said drums in the opposite direction from the rotation of the shaft on which it is mounted, each of said drums being hollow forming an inner chamber and a fluid in said chambers and in contact with said vanes.

8. In combination, a stationary tension means for a film, a sprocket to pull said film through said tension means, a rotatable drum to guide the film between the tension means and the sprocket, the film in contact with the drum serving as a means to rotate the drum, said drum being provided with a central hollow chamber, fluid in said chamber, a vane in said fluid, and means to rotate the vane in the opposite direction from the rotation of said drum.

9. In combination, a film gate and trap, a combined picture and sound film, a sprocket to pull said film through said film gate and trap, a light source to project light through the picture portion of the film while the same is continuously passing through the film gate and trap, a rotatable drum contacted by said film between the film gate and trap and the said sprocket whereby said drum is rotated in the direction of the movement of the film, said drum being hollow, a fluid in said hollow, a vane in said fluid, means whereby the vane is rotated in the opposite direction from the travel of the drum and a sound optical system interposed in the portion of the sound part of the film between the film gate and the drum.

10. In combination, a film gate and trap, a combined picture and sound film, a sprocket to pull said film through said film gate and trap, a light source to project light through the picture portion of the film while the same is continuously passing through the film gate and trap, a plurality of rotatable drums contacted by said film between the film gate and trap and the said sprocket whereby the part of said drums contacted by the film are moved in the same direction as the travel of the film, said drums being provided with hollow chambers, a fluid in said chambers, a vane in each of said chambers and immersed in said fluid, means whereby the vanes are rotated in the opposite direction from the travel of their respective drums and a sound optical system interposed in the portion of the sound part of the film between the film gate and the drums.

11. In combination, a rotatable drum provided with an inner chamber, means to pull a film while in contact with said drum so as to rotate said drum, a viscous fluid in said chamber, and means tending to prevent the rotation of said viscous fluid with said drum.

12. In combination, a rotatable drum provided with an inner chamber, means to pull a film while in contact with said drum so as to rotate said drum, a viscous fluid in said chamber and means to rotate the viscous fluid in the opposite direction from the rotation of said drum.

13. In combination, a rotatable drum provided with an inner chamber, means to rotate the drum in one direction, viscous fluid in said chamber, a shaft extending into said chamber, means to rotate the shaft in the opposite direction vanes on said shaft and drum, said vanes sloping forwardly in the direction of rotation of the shaft and drum respectively so that as the drum is rotated and as the fluid tends to be rotated with the drum, the vanes will force the fluid impinging on the same towards the center of the drum.

14. In combination, a rotatable drum provided with an inner chamber, means to rotate the drum in one direction, viscous fluid in said chamber, a shaft extending into said chamber, vanes on said shaft, said vanes being so positioned that each of them extend a substantial distance from the imaginary radius of the drum parallel to the said vane.

15. In combination, a rotatable drum provided with an inner chamber, the drum having inwardly extending sloping vanes, means to rotate the drum in one direction, a viscous fluid in said chamber, a shaft extending into the center of said drum and having oppositely extending sloping vanes, and means to rotate the shaft and vanes thereon in the opposite direction from the drum the vanes extending forwardly in the direction of rotation of the drum and shaft respectively, the ends of the vanes of the drum passing close to the ends of the vanes of the shaft when passing each other.

16. In combination, a hollow drum, means to pull a flexible member while it is in contact with said drum so as to rotate said drum, a vane in the hollow of said drum and attached to and rotatable with said drum, a shaft, means to prevent the shaft from rotating with the drum, a vane carried by said shaft and positioned within a portion of the hollow of the drum, said vanes being so positioned that they will clear each other as the drum rotates.

17. In combination, a hollow drum, means to pull a flexible member while it is in contact with said drum so as to rotate said drum, a vane in the hollow of said drum and attached to and rotatable with said drum, a shaft, means to prevent the shaft from rotating with the drum, a vane carried by said shaft and positioned within a portion of the hollow of the drum, said vanes being so positioned that they will clear each other as the drum rotates, the vane carried by the shaft extending radially therefrom and the vane carried by the drum extending diametrically thereof.

HERBERT GRIFFIN.